(12) United States Patent
Roberts et al.

(10) Patent No.: US 7,669,699 B2
(45) Date of Patent: Mar. 2, 2010

(54) BRAKE CALIPER

(75) Inventors: Paul Roberts, Newport (GB); Paul Anthony Thomas, Newport (GB); Anthony John Williams, Gwent (GB); Denis John McCann, Rochester Hills, MI (US); Carl Edward Heinlein, Newport (GB)

(73) Assignee: ArvinMeritor Light Vehicle Systems (UK) Limited, Birmingha, West Midlands (GB)

( * ) Notice: Subject to any disclaimer, the term of this patent is extended or adjusted under 35 U.S.C. 154(b) by 1195 days.

(21) Appl. No.: 10/635,219

(22) Filed: Aug. 6, 2003

(65) Prior Publication Data
US 2004/0079596 A1 Apr. 29, 2004

(30) Foreign Application Priority Data
Aug. 6, 2002 (GB) ................................ 0218165.9

(51) Int. Cl.
*F16D 55/18* (2006.01)
(52) U.S. Cl. ...................................... 188/72.4; 188/370
(58) Field of Classification Search ................. 188/370, 188/72.4, 72.5, 250 E, 73.32, 73.37, 73.38, 188/217, 196 P, 73.31, 234, 250 B, 250 G, 188/264 G, 205 A; 92/29, 84, 248; 267/161
See application file for complete search history.

(56) References Cited

U.S. PATENT DOCUMENTS

| | | | | |
|---|---|---|---|---|
| 3,348,887 A | * | 10/1967 | Sheps ........................... | 384/220 |
| 3,376,955 A | * | 4/1968 | Kamps et al ................ | 188/72.4 |
| 3,977,498 A | | 8/1976 | Ogawa | |
| 4,537,289 A | * | 8/1985 | VonGrunberg et al. ...... | 188/72.4 |
| 4,596,317 A | * | 6/1986 | Nagai et al. ................. | 188/72.4 |
| 4,605,104 A | * | 8/1986 | Thompson .................. | 188/72.4 |
| 5,964,321 A | * | 10/1999 | Hinkens ...................... | 188/72.4 |
| 6,318,514 B1 | * | 11/2001 | Hinkens et al. ........... | 188/73.38 |
| 6,634,469 B2 | * | 10/2003 | Storzel et al. ............. | 188/73.38 |
| 2004/0163899 A1 | * | 8/2004 | Heinlein ..................... | 188/72.1 |

FOREIGN PATENT DOCUMENTS

| | | | |
|---|---|---|---|
| DE | 1223633 | * | 7/1964 |
| DE | 12 58 210 B | | 1/1968 |
| DE | 2610651 | | 9/1977 |
| DE | 33 17 980 A1 | | 11/1984 |
| DE | 3317978 | * | 11/1984 |
| DE | 004324988 A1 | * | 2/1995 |
| DE | 4332669 | | 3/1995 |
| DE | 100 11 778 A1 | | 2/2001 |

(Continued)

OTHER PUBLICATIONS

European Search Report dated Aug. 4, 2004.

(Continued)

*Primary Examiner*—Robert A Siconolfi
(74) *Attorney, Agent, or Firm*—Carlson Gaskey & Olds

(57) ABSTRACT

A brake caliper has a brake pad having a backplate with a friction material attached to one side and a loading face on an opposite side. The caliper further includes a piston that applies a force to the loading face. The brake pad is releasably attached to the piston, thereby eliminating a separate brake pad retaining structure in the caliper.

14 Claims, 6 Drawing Sheets

FOREIGN PATENT DOCUMENTS

| | | |
|---|---|---|
| EP | 000785372 A1 * | 7/1997 |
| EP | 001391628 A2 * | 2/2004 |
| EP | 001391628 A3 * | 10/2004 |
| GB | 2090353 | 7/1982 |
| GB | 2123909 | 12/1995 |
| GB | 2303891 | 3/1997 |
| JP | 8-159184 * | 6/1996 |

OTHER PUBLICATIONS

Examination Report dated Aug. 4, 2008.

* cited by examiner

BRAKE CALIPER

REFERENCE TO RELATED APPLICATIONS

This application claims priority to United Kingdom (GB) patent application No. 0218165.9 filed on Aug. 6, 2002.

TECHNICAL FIELD

The present invention relates to brake pad backplates, brake pads and brake calipers.

BACKGROUND OF THE INVENTION

Brake calipers, which are known in the art, force brake pads towards a brake disc to effect braking of the disc. The brake pads comprise a brake pad backplate, typically stamped from sheet steel, onto which is fixed friction material. The friction material is forced into engagement with the brake disc to effect the braking and progressively wears out through the life of the brake pad. Once the brake pads have worn out, they are removed (with the brake disc and brake caliper in situ) by withdrawing the pads in a radially outward direction with respect to the brake disc. Various retaining features, such as pad springs and pad retainers, need to be removed before the worn brake pads can be removed.

Additionally, the brake caliper will include a housing on one side of the brake disc in which one or more pistons is mounted. A bridge is fixed to the housing (or is integral therewith) and straddles the brake disc to support a further brake pad on the opposite side of the brake disc. The housing and bridge together are known as a brake caliper frame.

The brake caliper frame is slidably mounted on a brake carrier, which in turn is non-rotatably mounted on suspension components adjacent to the brake disc.

During servicing of the caliper, the old worn brake pads are removed from the caliper in a radially outward direction. Clearly, the pads must be prevented from escaping from the caliper when the vehicle is in use. One known way of retaining the pads is to provide a pad retaining strap and bolt (as shown in FIG. 2).

UK patent application GB2303891, for example, shows a brake piston capable of applying a force to a brake pad to apply a brake. However, in this prior art structure the piston is a loosely fitted in a recess of the backplate of the brake pad. The piston is not attached to the brake pad. As such, this design will require additional features, such as a strap and/or bolt (not shown), to retain the pad in the caliper.

An object of the present invention is to provide an improved form of brake caliper that does not require complex pad retention structures.

SUMMARY OF THE INVENTION

One embodiment of the invention is directed to a brake caliper including a brake pad having a backplate with a friction material attached to one side and having a loading face on an opposite side, the caliper further including a piston for applying a force to the loading face in which the brake pad is releasably attached to the piston. By releasably securing the pad to the piston, it is not necessary to provide any other means of retaining the pad in the caliper.

The inventive alternative arrangement for pad retention, which uses features of the piston and brake pad, simplifies the process for retaining the pad in the caliper since a pad retaining strap and an associated bolt are no longer required. In particular, it is not necessary in the inventive structure to provide a pad strap retainer, a bolt or any associated machining.

According to a further aspect of the present invention, there is provided a kit of parts including a brake pad having a back plate with a friction material attached to one side and having a loading face on an opposite side, and a retaining means for releasably retaining the brake pad to a brake caliper piston or a brake caliper.

According to a further aspect of the present invention, there is provided a method of assembling a brake pad into a caliper comprising the steps of: providing a brake pad having a back plate with a friction material attached to one side and having a loading face on an opposite side, providing a caliper defining a brake disc plane and including a piston for applying a force to the loading face, inserting the brake pad into the brake caliper in a direction generally parallel to the brake disc plane, and moving one of the pad or piston in a direction generally perpendicular to the brake disc plane to simultaneously engage the piston with a location feature of the pad, thereby releasably attaching the pad to the piston.

BRIEF DESCRIPTION OF THE DRAWINGS

The invention will now be described, by way of example only, with reference to the accompanying drawings in which.

DETAILED DESCRIPTION OF THE EMBODIMENTS

Figure 1:
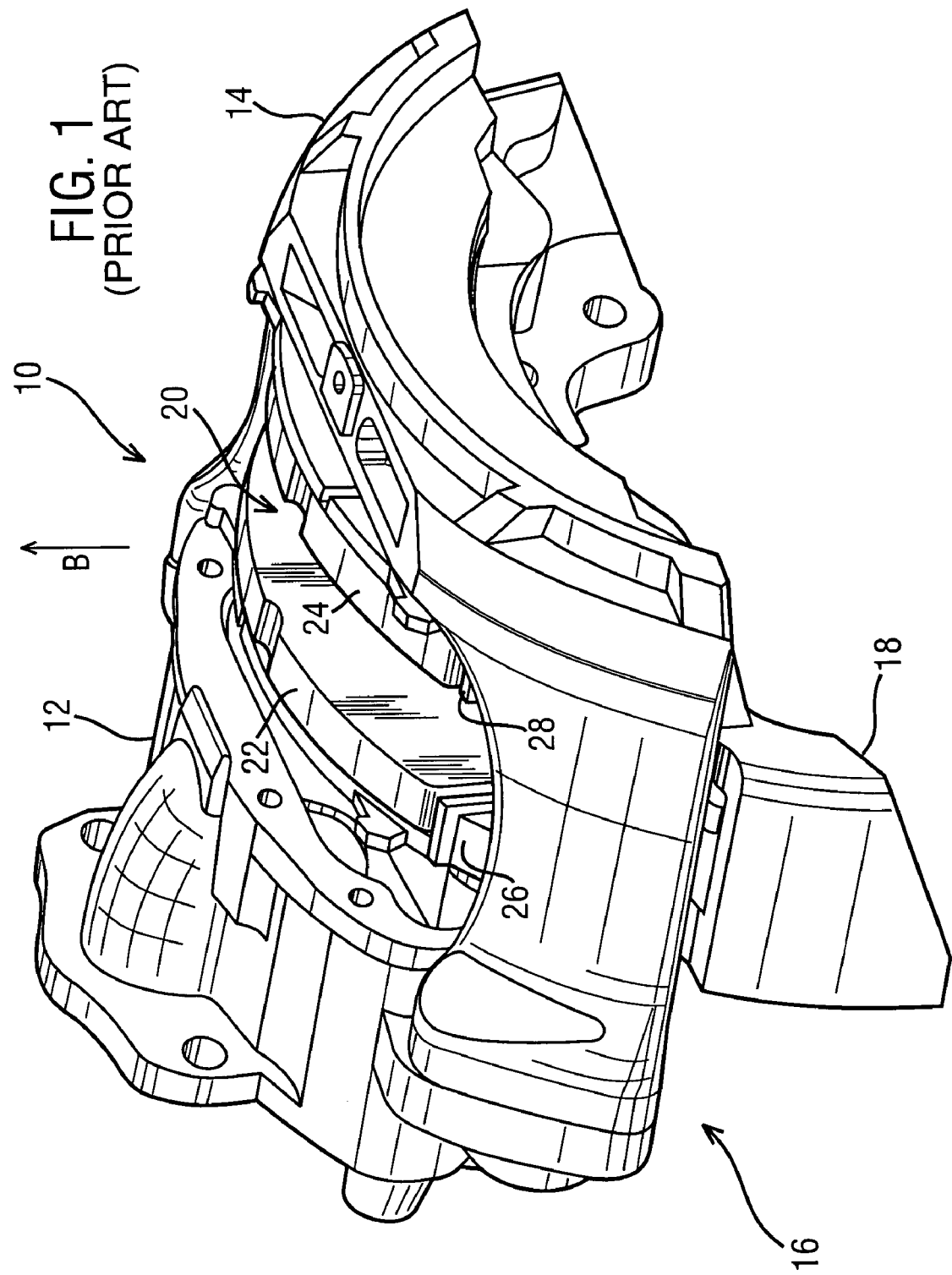
FIG. 1 is in isometric view of a known caliper assembly.
Figure 2:
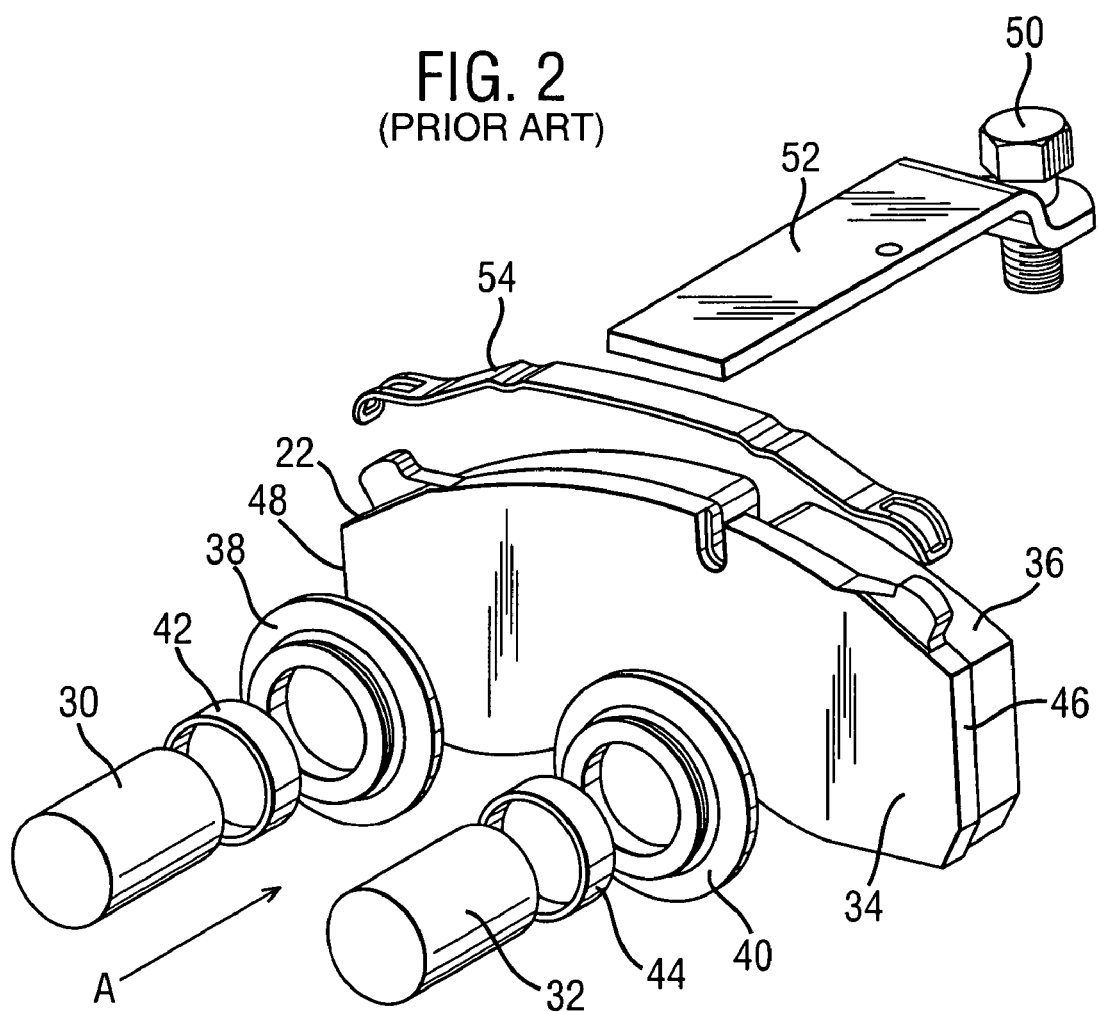
FIG. 2 is an exploded view of parts of the caliper assembly of FIG. 1.

FIGS. 1 and 2 show a known brake caliper 10 having a housing 12 and a bridge 14, which together form a frame 16. In this case, the housing 12 and the bridge 14 are individual components that are bolted together, though the housing 12 and bridge 14 can be integrally formed as a single component. The frame 16 is slidably mounted on a brake carrier 18, which is non-rotatably fixed to suspension components of an associated vehicle (not shown).

The frame 16 includes an aperture 20, which defines a disc brake plane. Mounted within the aperture 20 are an inner brake pad 22 and an outer brake pad 24. The inner brake pad 22 is circumferentially positioned between two inner carrier abutments 26 (only one of which is shown in the Figures for clarity). The outer brake pad 24 is similarly positioned between two outer carrier abutments 28 (only one of which is shown in the Figures for clarity).

Two pistons 30 and 32 are mounted in the housing 12 and are actuated by an actuator (not shown) to force the inner brake pad 22 in the direction of arrow A of FIG. 2. This causes the inner brake pad 22 to move toward the brake disc. The reaction load of the actuator acts on the frame 16 to cause the frame 16 to move the outer brake pad 24 toward the brake disc, thus producing a braking torque on the disc. The inner and outer brake pads 22 and 24 are identical and include a brake pad backplate 34 and friction material 36. In one structure, the brake pad backplate 34 is stamped from 8 mm thick sheet steel.

When the pistons are actuated to apply the brake, they each act through a piston head 38 and 40, which distribute the piston force across a larger area of the brake pad backplate 34. The piston heads 38 and 40 are retained on their respective pistons 30 and 32 by respective retaining rings 42 and 44. It should be noted that the piston heads 38 and 40 are required because without them, the piston would apply very localized forces to small regions of the backplate, which in turn would cause uneven wear of the friction material 36 due to flexing of the backplate during use.

Furthermore, it should be noted that the circumferential ends 46 and 48 of the brake pad the backplate 34 engage the inner carrier abutments 26 of the brake carrier 18 to transfer brake torque loads to the vehicle suspension. As the brake pads 22 and 24 wear, the circumferential ends 46 and 48 move progressively towards the brake disc, progressively sliding along the inner carrier abutments 26. Clearly, the inner carrier abutment 26 is spaced from the outer carrier abutment 28 by a distance slightly greater than the thickness of the brake disc to allow the brake disc to sit therebetween. Thus, there is a gap between the edge of the brake disc and the edge of the inner carrier abutment 26, and a similar gap between the edge of the brake disc and the edge of the outer carrier abutment 28. As the brake disc wears, this gap increases and the thickness of the brake pad backplate 34 must be sufficient to ensure sufficient engagement of the brake pad backplate 34 with the inner carrier abutment 26 or the outer carrier abutment 28 when the friction material 36 is fully worn and the brake disc has worn to its working limit.

Once the brake pads 22 and 24 are worn, the retaining bolt 50 is unscrewed, allowing removal of the pad retainer 52. The worn brake pads 22 and 24 can then be withdrawn through the aperture 20 in the direction of arrow B of FIG. 1 (i.e. generally upwardly when viewing the Figure) clear together with the pad springs 54.

The pistons 30 and 32 can then be wound back into the housing 12 and the frame 16 can be repositioned relative to the brake disc so that new brake pads 22 and 24 can be inserted and secured in place with the pad retainer 52 and the retaining bolt 50. It would be appreciated that the brake pads 22 and 24 are withdrawn generally radially outwardly and are replaced by inserting them into the aperture 20 in a generally radially inwardly direction.

The pad springs 54 provide for a limited amount of movement of the brake 22 in a plane parallel to the disc brake plane. In particular, one of the functions of the pad spring 54 is to reduce noise caused by rattling of the brake pad 22.

The friction material 36 can be glued to the brake pad backplate 34, though under certain circumstances a more positive form of location is required to ensure sufficient shear strength at the backplate/friction material joint. Typically, the brake pad backplate 34 may have holes drilled or stamped in it or a separate steel mesh may be welded to the friction material side of the brake pad backplate 34 to receive friction material 36 and hence increase the shear strength.

As noted above, the retaining bolt 50 and pad retainer 52 make removal and replacement of worn brake pads 22 and 24 inconvenient. Further, the retaining bolt 50 and the pad retainer 52 are additional structures that increase the complexity of the braking system. The inventive structure eliminates a separate pad retention structure by using the pistons themselves as the pad retention structure.

Figure 3:
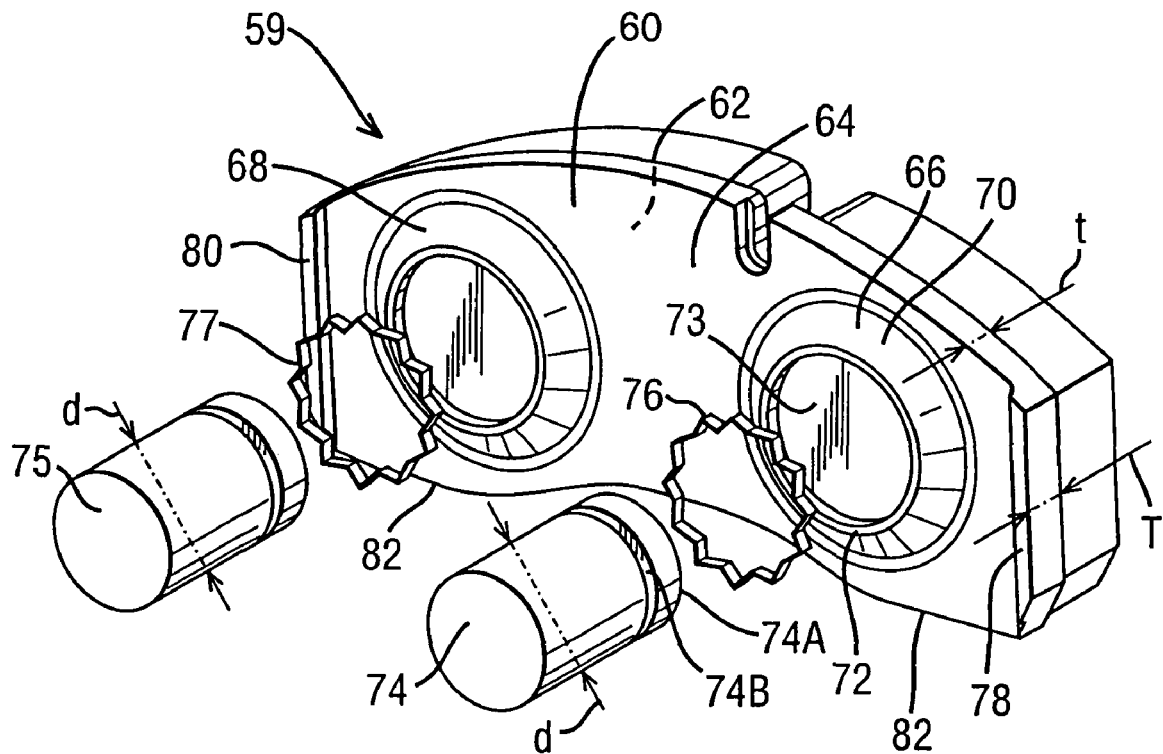
FIG. 3 is an isometric view of a brake caliper according to the present invention.
Figure 4:
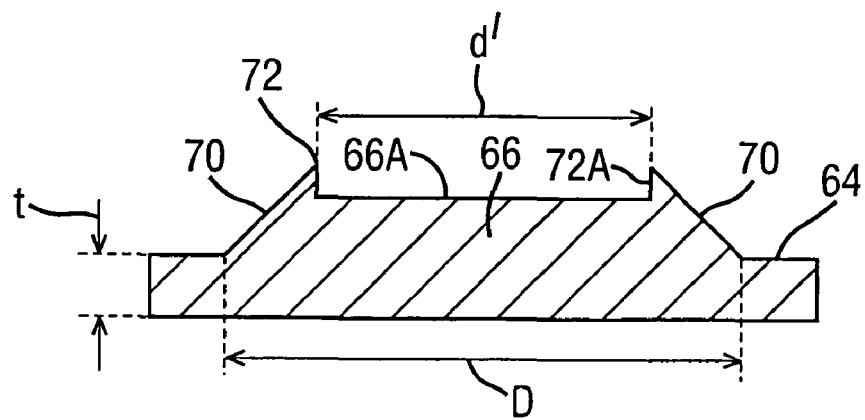
FIG. 4 is a cross section view of the brake pad backplate of FIG. 3.

More particularly, FIGS. 3 and 4 show one embodiment of the invention having a brake pad 59 with a brake pad backplate 60 that is generally planar. The brake pad 59 has a frictional material surface 62 on one side and a loading face 64 on an opposite side. The loading face 64 includes two local load spreading features in the form of identical raised bosses 66 and 68. It should be noted that the top of the boss 66 (when viewing FIG. 4) has a diameter d', which is smaller than the diameter D of the lower portion of the boss 66. Thus, the boss 66 is able to act as a load spreading feature.

The bosses 66, 68 are circular and have an edge 70 that tapers towards the loading face 64. The bosses 66, 68 further include a location feature in the form of a raised abutment 72. The raised abutment 72 is annular and has a diameter d' that is slightly larger than the diameter d of an end 74A of a piston 74. The present invention also includes another piston 75.

Figure 5:
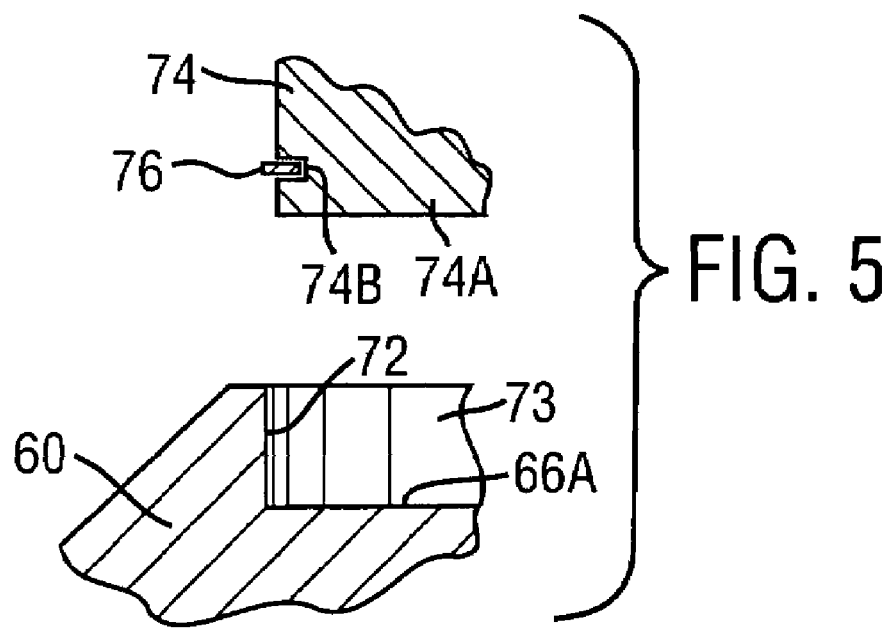
FIG. 5 is an enlarged cross section view of part of the piston and backplate of FIG. 3.

The pistons 74 and 75 are both of substantially uniform circular cross section having diameter d. The following description will focus on one of the two pistons 74 and 75, but the description is applicable to both the pistons 74 and 75. The end 74A (also known as a piston feature) of the piston 74 includes an annular groove 74B. A resilient means in the form of a wavy spring 76 is assembled into the annular groove 74B (also shown in FIG 5). A wavy spring 77 is also assembled in an annular groove in the piston 75. The piston 74 and the wavy spring 76 are then inserted into the recess 73 formed by the surface 66A of the boss 66 and the raised abutment 72. This assembly process can either be achieved by moving the brake pad 59 towards the piston 74 or alternatively by moving the piston 74 towards the brake pad 59 as will be further described below.

The wavy spring 76 is designed as an interference press fit in the recess 73, and hence the wavy spring 76 ensures that end 74A of the piston 74 remains in contact with surface 66A when the associated vehicle is in use. In this way, the brake pad 59 is positively attached to the piston 74 in a releasable manner. The interference press fit ensures that the brake pad 59 cannot inadvertently fall out or bounce out of the brake caliper 10 during use, even if there is excessive pad-to-rotor clearance. Excessive clearance might occur if an associated brake adjuster fails to adjust the brakes following wear or if a partially failed wheel bearing results in excessive wobble of the brake disc, thereby knocking back the brake pad 59 and the piston 74 into the brake caliper 10 excessively. In particular, the inventive structure eliminates the need for a separate pad retainer. It will be appreciated that it is possible to design a caliper where the attachment between the brake pad 59 and the piston 74 is the sole means of preventing the brake pad 59 inadvertently falling out or bouncing out of the brake caliper 10 during use.

In addition to providing an interference push fit, the wavy spring also allows a limited amount of radial movement of the brake pad relative to the piston. In particular, the resilience of the wavy spring can be used to prevent pad rattle. Thus, in some applications, the wavy springs 76 and 77 fulfill the function of the pad spring 54 of the prior art.

Note that the wavy spring 76 is similar to proprietary components known as "tolerance rings". Thus, under certain circumstances, it would be possible to design the piston and brake pad backplate to incorporate "off the shelf" tolerance rings rather than having a specific unique wavy spring.

The brake pad backplate 60 is generally arcuate and has circumferential ends 78 and 80. The circumferential ends 78 and 80 are locally thickened (T) when compared with the thickness (t) of the main portion of the brake pad backplate 60. This local thickening (T) ensures that there is adequate engagement of the circumferential end 78 and 80 with its associated carrier abutment even at the extremes of brake pad 59 and disc wear. Similar local thickening (not shown) may be provided on a radially inner edge 82 of the brake pad backplate 60, where it abuts the associated caliper.

If necessary, one or more holes can be provided to receive friction material. Alternatively, or additionally the friction material surface 62 of the brake pad backplate 60 can be provided with recesses, in particular in the form of mesh, to improve the shear strength of the friction material/backplate joint.

In view of the above various features mentioned in relation to a brake pad backplate according to the present invention, it can be seen that there are several additional features when compared to known brake pad backplates stamped from sheet steel. Thus, while it is possible to machine various features from a solid backplate, or alternatively fabricate the components, it is particularly advantageous to provide some or all of these features integrally with a cast backplate, preferably cast from iron or steel.

Figure 11:
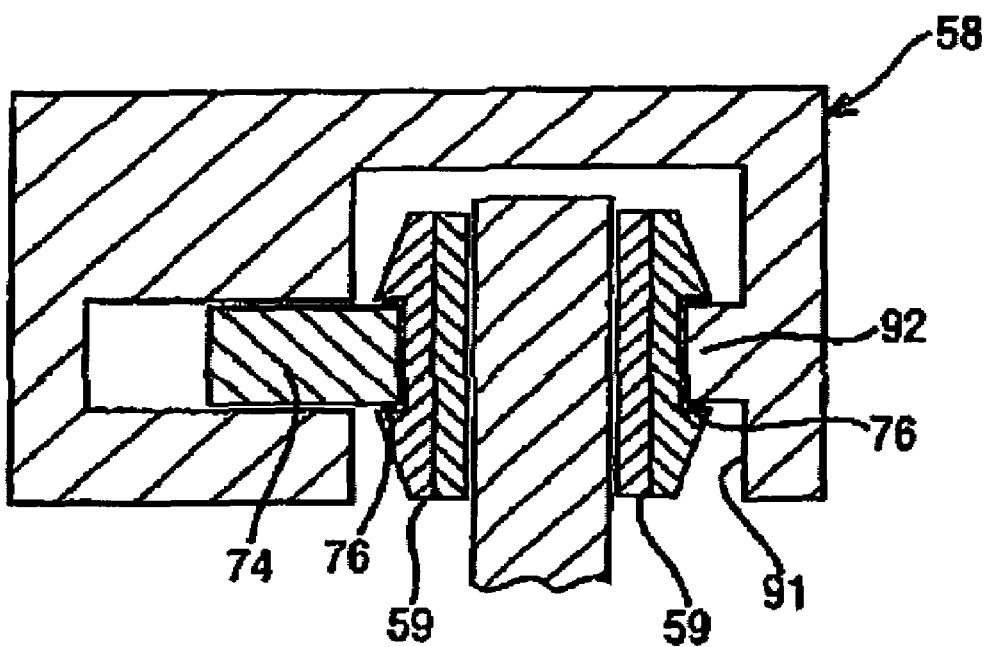
FIG. 11 shows a schematic cross-section view of a caliper according to the present invention.

The inventive brake pad backplate 60 has been described in with respect to a piston of an associated caliper 58 (see FIG. 11). Such a caliper 58 can be generally similar to a known brake caliper 10 and would be designed to accommodate two identical brake pads 59 according to the present invention. In particular, where the outer brake pad 59 (i.e. the brake pad 59 on the opposite side of the brake rotor to the piston 74) rests against an inner surface 91 of the caliper bridge, the caliper bridge can include formations which allow the brake pad 59 to be releasably attached to the caliper 58. Thus, the inner surface 91 of the bridge might typically include two annular projections 92 (only one shown on FIG. 11 for clarity), each projection 92 having a diameter equivalent to the diameters of the pistons 74 and 75, and being spaced apart by a distance equivalent to the spacing of the pistons 74 and 75. Thus, it can be seen that the projections 92 (also known as dummy piston features) are mirror images of the shape of the ends of pistons 74 and 75.

It should be noted that to remove the inner and outer brake pads 22 and 24 of the prior art shown in FIG. 2, for example during servicing, they are removed in a radial direction relative to the brake disc once the bolt and pad retainer have been removed.

However, the present invention provides a novel method of assembling brake pad backplates 60 either during initial assembly or during re-assembly following servicing. Thus, in order to assemble the brake pad backplate 60 in the outer position of the caliper 58 (i.e., into the position equivalent to the outer brake pad 24 of FIG. 1), the brake pad 59 has to be inserted in a radial direction and then subsequently moved in an axial direction, away from the brake disc, to engage the location features of the brake pad backplate 60 with further features (e.g., the projections 92 or dummy piston features) on the inner surface 91 of the bridge, thereby simultaneously fitting the brake pad 59 and attaching the brake pad 59 to the projection 92 or dummy piston feature.

Similarly, when the brake pad backplate 60 is assembled in an inner position (i.e. in a position equivalent to the inner brake pad 22 of FIG. 1), the brake pad backplate 60 has to be first moved in a radially inward direction and then in an axial direction away from the brake disc so that the location features or raised abutment 72 of the brake pad backplate 60 engage with the pistons 74 and 75, thereby simultaneously fitting the brake pad 59 and attaching the brake pad 59 to the pistons 74 and 75.

An alternative method of assembling the brake pad backplate 60 into a caliper is to first move the brake pad backplates 60 in a radial direction so that the friction material is proximate the brake disc surface, and then to apply the brake so that the piston 74 and the inner face of the bridge approach and engage with the location features or raised abutment 72 on the brake pad backplate 60, thereby preventing escape of the brake pads 59 during subsequent normal use of the vehicle.

Thus, the inventive method of assembly of the present invention is to provide axial movement of the backplate relative to the piston or relative to the bridge as appropriate to engage the location feature and prevent the escape of the backplate from the caliper during subsequent normal use of the vehicle.

Figure 6:
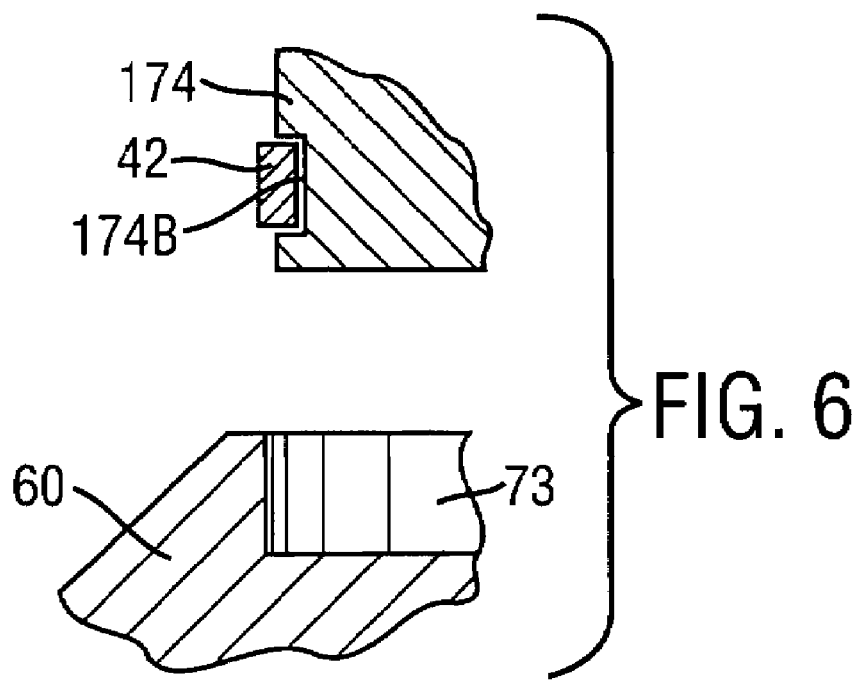
FIG. 6 is an alternative method of securing a piston and backplate of the present invention.

FIG. 6 shows an alternative piston structure 174 including a larger groove 174B designed to accommodate the retaining ring 42. This piston and retaining ring subassembly can be assembled onto the brake pad backplate 60 according to the present invention. In this case, the retaining ring 42 has an interference fit with the recess 73 of the brake pad backplate 60.

Figure 7:
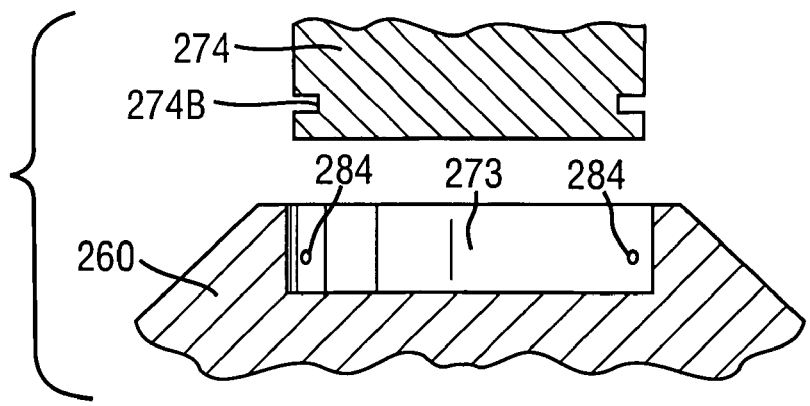
FIGS. 7 to 9 show a yet further method of securing a piston to a backplate of the present invention.
Figure 8:
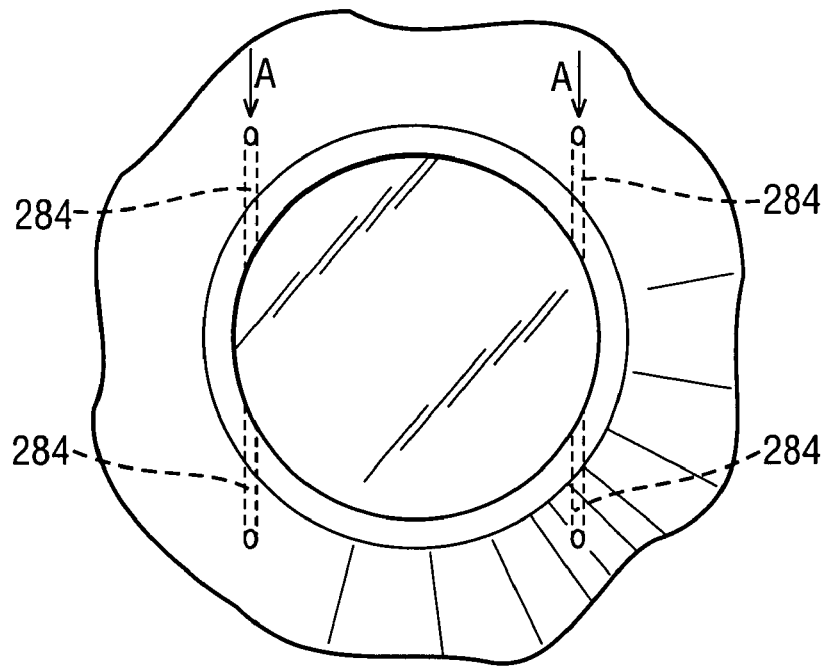
Figure 9:
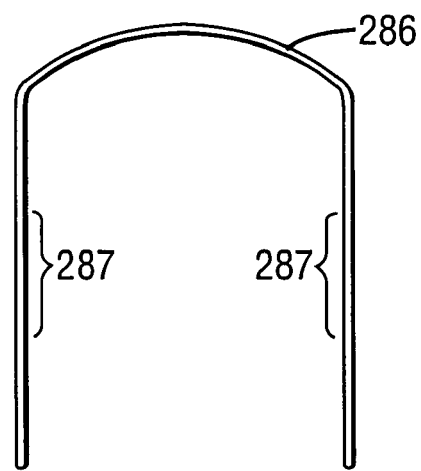

FIGS. 7 to 9 show an alternative piston structure 274 having a groove 274B. An alternative brake pad backplate 260 is provided which, in this case, includes chordally-oriented holes 284. In this case, the piston structure 274 is inserted into the recess 273 and then the spring clip 286 is inserted in the direction of arrows A through the holes 284 such that regions 287 of the spring clip sit within the groove 274B, thus retaining the piston structure 274 to the brake pad.

In further embodiments, a single pin could be used. Such a single pin could be radially or chordally-oriented relative to the piston. The pin could be arranged to fit in a hole of the piston, rather than in a circumferential groove of the piston.

FIG. 3 shows a piston feature (the piston end) in the form of a projection, which engages in a recess of the brake pad backplate. In further embodiments, a projection on the brake pad backplate could be arranged to engage a recess in the piston.

It will be appreciated that the wavy springs 76 and 77 act as retaining features to retain the pad to the piston. Similarly, the retaining ring 42 when used as shown in FIG. 6 acts as a retaining feature. Again, spring clip 286 acts as a retaining feature.

When a set of brake pads according to the present invention have been worn out through use, then a brake pad kit will be purchased in order to replace the worn brake pads. This kit might typically include a set of brake pads, along with appropriate retaining features, i.e. a set of wavy springs 76, or a set of retaining rings 42, or a set of spring clips 286.

Figure 10:
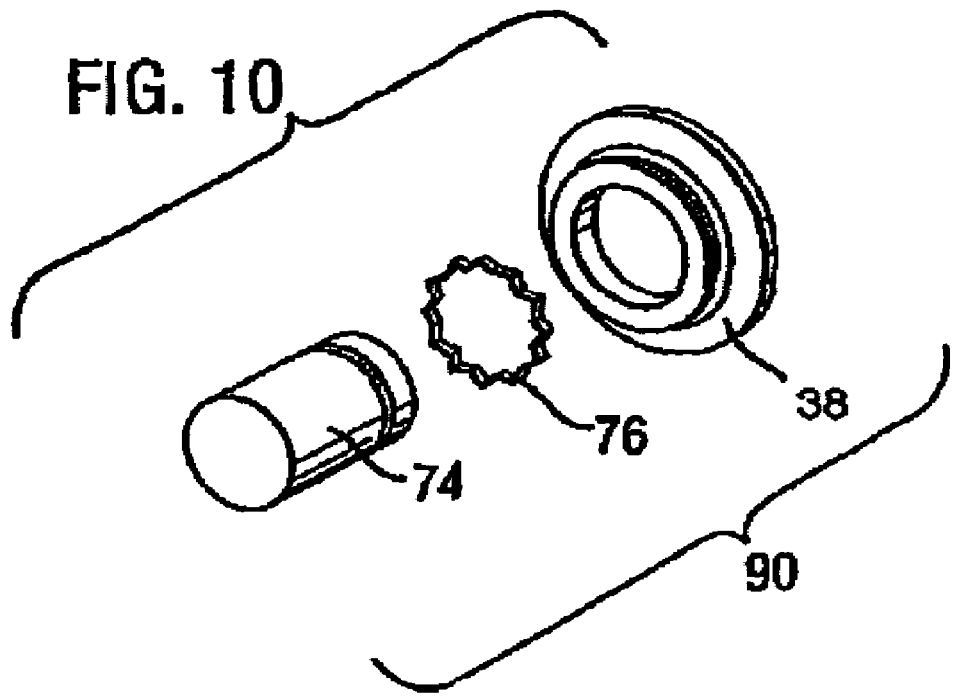
FIG. 10 shows an exploded view of a piston/piston head subassembly according to a further aspect of the present invention.

The invention has been hereinbefore described in relation to a novel and inventive brake caliper. However, the wavy spring 76 described above can be used to attach a piston 74 to the known piston head 38 to form a piston/piston head sub-assembly 90 (see FIG. 10). This sub-assembly can be used in prior art calipers with prior art brake pad backplates 34. In particular, the wavy spring 76 provides an additional anti-rattle feature that can be incorporated in known brake assemblies.

In this case, the wavy spring is received in the annular groove 74B of the piston 74. In an alternative embodiment, the piston head 38 could be provided with an internal groove to receive the wavy spring 76, and thus the piston 74 would not require the annular groove 74B. It would be appreciated that, in a similar manner, the grooves of the piston 74 and 75 as shown in FIG. 3 could be transferred to the corresponding recesses on the brake pad backplate 60.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A brake caliper comprising:
   a brake pad having a backplate with a friction material attached to one side and having a loading face on an opposite side;
   a piston for applying a force to the loading face; and
   an annular wavy spring, wherein the brake pad is releasably attached to the piston by the annular wavy spring.

2. The brake caliper as defined in claim 1, wherein the brake pad comprises a location feature and the piston comprises a piston feature, wherein the location feature cooperates with the piston feature to locate the brake pad relative to the piston and to releasably attach the brake pad to the piston.

3. The brake caliper as defined in claim 2, wherein the piston feature is one of a projection and a recess and the location feature is the other of the projection and the recess.

4. The brake caliper as defined in claim 1, further comprising a resilient member disposed between the piston and the brake pad to releasably attach the brake pad to the piston.

5. The brake caliper as defined in claim 4, wherein the resilient member permits limited movement of the brake pad relative to the piston in a plane parallel to the loading face of the brake pad.

6. The brake caliper as defined in claim 4, wherein the piston comprises a piston feature that is one of a projection and a recess and the location feature is the other of the projection and the recess, and wherein the resilient member is press fitted on at least one of the projection and the recess.

7. The brake caliper as defined in claim 6, wherein the resilient member is press fitted on one of the projection and the recess and is mounted in a groove of the other of the projection and the recess.

8. The brake caliper as defined in claim 1, wherein the annular wavy spring surrounds an end of the piston.

9. The brake caliper as defined in claim 1, wherein the brake pad has a location feature with a recess, and wherein the annular wavy spring is received in location feature.

10. The brake caliper as defined in claim 9, wherein the recess of the location feature is substantially parallel-sided.

11. A brake caliper comprising:
    a brake pad having a backplate with a friction material attached to one side and having a loading face on an opposite side;
    a piston for applying a force to the loading face; and
    a tolerance ring, wherein the brake pad is releasably attached to the piston by the tolerance ring.

12. The brake caliper as defined in claim 11, wherein the tolerance ring surrounds an end of the piston.

13. The brake caliper as defined in claim 11, wherein the brake pad has a location feature with a recess, and wherein the tolerance ring is received in location feature.

14. The brake caliper as defined in claim 13, wherein the recess of the location feature is substantially parallel-sided.

* * * * *